United States Patent [19]
Tuniman et al.

[11] Patent Number: 5,644,737
[45] Date of Patent: Jul. 1, 1997

[54] METHOD AND SYSTEM FOR STACKING TOOLBARS IN A COMPUTER DISPLAY

[75] Inventors: David Charles Tuniman; Vinod Anantharaman, both of Redmond; Michael Halvar Jansson, Bellevue, all of Wash.

[73] Assignee: Microsoft Corporation, Redmond, Wash.

[21] Appl. No.: 466,611

[22] Filed: Jun. 6, 1995

[51] Int. Cl.$^6$ .................................. G06F 5/01; G06F 1/00
[52] U.S. Cl. ........................................ 395/352; 395/348
[58] Field of Search ............................... 395/155, 156, 395/157, 159, 161, 351, 348, 352, 354

[56] References Cited

U.S. PATENT DOCUMENTS

| | | | |
|---|---|---|---|
| 5,500,936 | 3/1996 | Allen et al. | 395/156 |
| 5,506,952 | 4/1996 | Choy et al. | 395/156 |

OTHER PUBLICATIONS

Perfectoffice® Desktop Application Director (Trademark of Novell, Inc.), 1994, pp. 1–15.
Microsoft Word Ver. 6.0c (Trademark of Microsoft Corporation), 1994, pp. 1–2.

*Primary Examiner*—Phu K. Nguyen
*Assistant Examiner*—Cliff N. Vo
*Attorney, Agent, or Firm*—Ronald M. Anderson

[57] ABSTRACT

A plurality of toolbars that include graphic objects, which can be selected by the user, are arranged in a stack. Only the graphic objects on one or more selected toolbars are displayed. The user can selectively choose a toolbar that has graphic objects currently hidden by the selected toolbar(s), causing one or more of the toolbars to move aside, exposing the group of graphic objects associated with the toolbar newly selected by the user. Movement of the toolbar(s) to disclose the graphic objects on the newly selected toolbar is preferably accomplished by animating the toolbar(s) to slide to different positions, so that the graphic objects or buttons on the newly selected toolbar are displayed. For added realism, the animation sequence used to disclose graphic objects on a selected toolbar includes an audible sound and a "bump" as the toolbar(s) reach a rest position.

33 Claims, 9 Drawing Sheets

METHOD AND SYSTEM FOR STACKING TOOLBARS IN A COMPUTER DISPLAY

FIELD OF THE INVENTION

This invention generally pertains to a method and system for displaying graphic controls on a computer screen, and more specifically, to the configuration and properties of toolbars comprising a plurality of graphic icons that are displayed for interactive control by a user.

BACKGROUND OF THE INVENTION

Graphics user interface operating systems, such as Microsoft Corporation's WINDOWS™ and related products, have greatly improved the ease with which tasks can be accomplished on the computer. Instead of requiring the user to remember the file name and path of an application program in order to execute it, as has conventionally been the case in text-based operating systems, in a graphic operating system, the user need only activate an icon that represents the application. The graphic icon is activated by positioning a cursor over it and then "double-clicking" on the icon with a pointing device that is used to control the cursor. Since the properties assigned to the graphic icon link it to the executable file and specify its complete directory path, there is no need for the user to recall that information after the icon properties are initially setup to run the program.

Typically, a user will arrange a number of frequently used applications in different groups based on subject matter or common task relationship. Within a group, each application is represented by a graphic icon. In certain desktop shells, the graphic icons representing different applications are arranged in panels of buttons that can be configured in different rectangular shapes by dragging on a side of the panel with the cursor using the pointing device.

Graphic icons are also commonly used within applications to represent different tools, controls, commands, macros, or procedures. For example, Microsoft Corporation's Word for Windows includes several toolbars, each comprising a plurality of different graphic icon buttons that can be selected to carry out various tasks in the word processing system. The user can customize a toolbar or build a new one by adding or deleting graphic icon buttons. The appearance of any graphic icon button can be altered by editing the bitmap that appears on it in an icon editing utility. Toolbars are thus well known in the art and frequently used because they enable a user to immediately access tools within applications, just as the panels of graphic icon buttons that represent different applications or programs enable those applications to be immediately selected on the desktop of the graphic user interface.

However, there is a limitation on the number of graphic icons that can be available to the user. Each time that a toolbar is selected by the user to be left open on the computer screen, the space occupied by the toolbar becomes unavailable for display of other information or data. In a word processing system, the user may find that having more than two or three toolbars open at a time reduces the display screen area for the document being created or edited to an unacceptable extent. The loss of display screen area to toolbars is particularly noticeable if the user is running the display at a relatively low resolution, e.g., 640×480 pixels. Although the toolbars can be docked to one side or to the top or bottom of the screen so that they are not floating over and obscuring a document, the area that they occupy is not available to display the text of the document. Consequently, the user is forced to choose between the convenience of readily accessing tools and applications by simply activating the corresponding graphic icons on the toolbars, or of having more display screen area available for text and other data. It would clearly be preferable to provide an alternative approach that enables the user to quickly access multiple toolbars without unduly limiting the screen area that is available for displaying text and graphics. Any such solution should allow the user the same kinds of flexibility in configuring toolbars and in positioning them at different points in the display as is presently available. The prior art does not appear to provide an acceptable solution to this problem.

SUMMARY OF THE INVENTION

In accordance with the present invention, a method is defined for providing access to a plurality of graphic objects in a computer display. The method includes the step of organizing the plurality of graphic objects into a plurality of generally quadrilaterally shaped toolbars. Each toolbar comprises a group of associated graphic objects organized in an array (one or two-dimensional). A stack of the plurality of toolbars is created on the computer display, so that any selected toolbar is fully visible and hides a substantial portion of any non-selected toolbar. (Note that the invention contemplates having more than one toolbar selected and fully visible.) A graphic object in any selected toolbar that is fully visible to a user on the computer display is directly selectable by the user to activate the graphic object. The user is enabled to choose any non-selected toolbar from among the plurality of toolbars, causing the toolbar that is thus chosen by the user to become a selected toolbar. The graphic objects on the chosen toolbar then become fully visible to the user on the computer display. A previously selected toolbar also then becomes a non-selected toolbar that is no longer fully visible, because a substantial portion of the previously selected toolbar is substantially hidden by the toolbar just chosen by the user.

Preferably, the graphic objects include buttons that are activated when the user clicks a select button on a pointing device while a cursor controlled by the pointing device is positioned over the button. To facilitate selection of a desired toolbar, each of the toolbars is provided with a characteristic identification that distinguishes that toolbar from at least some of the other toolbars disposed in the stack. The characteristic identification includes at least one alphanumeric character and/or logo that is disposed on the toolbar in a position remaining visible when a substantial portion of the toolbar is hidden by a selected toolbar.

A separate toolbar is added to the stack by enabling the user to select the separate toolbar with a pointing device and then to drag the separate toolbar onto the stack. Similarly, the method preferably further comprises the step of enabling the user to unstack the plurality of toolbars by selecting one of the toolbars comprising the stack and dragging that toolbar away from the stack. The toolbar dragged away becomes a separate toolbar that is no longer a part of the stack.

In addition, the method preferably includes the step of enabling the user to select the stack with a pointing device and to drag the stack to an edge of a window on the computer display screen, docking the stack at the edge. The user is also preferably enabled to change an orientation of the stack between vertical and horizontal, where the orientation relates to a longitudinal dimension of the plurality of toolbars comprising the stack.

The method also includes the step of causing one of the toolbars to slide in order to enable the toolbar chosen by the user to become fully visible. Preferably included are the steps of causing the toolbar that is sliding to decelerate as it approaches a rest position; and, causing the toolbar that is sliding to bounce before stopping. To enhance the realism of this sliding motion, it is associated with an audible sound.

In an auto-hide mode, the user is enabled to selectively hide the stack along an edge of a window on the computer display. In this mode, only a line of pixels comprising a border of the stack is visible at the edge of the window. Similarly, the user is enabled to selectively fully display the stack that is hidden in the auto-hide mode. Although unrelated, another feature enables the user to selectively autosize the stack to encompass a largest toolbar within the stack.

Yet another sizing feature of the method enables a user to selectively move the stack into a border region of a window on the computer display. In response to this action, the stack is caused to auto-fit within the border by adjusting dimensions of the stack and of the graphic objects that are fully displayed within any selected toolbar. The stack is positioned adjacent a window control in the border region.

The user is enabled to selectively float the stack on the computer display, and while the stack is floating, can modify a width and a length of the stack.

In another preferred step, the user is enabled to use a pointing device to select a graphic object appearing on the computer display outside of the stack. The graphic object that is selected can be dragged onto a toolbar comprising the stack, thereby adding the graphic object to the group of graphic objects within the toolbar. Optionally, the user can select one of the graphic objects comprising a toolbar and drag the graphic object to another toolbar for association with the group of graphic objects comprising the other toolbar. Alternatively, the user can select one of the graphic objects comprising a toolbar and drag the graphic object to a position outside of the stack, onto the computer display, causing the graphic object to become separated from the stack. The user is further enabled to select an object visible on the computer display with the pointing device; the object can then be dragged and dropped onto one of the graphic objects that is fully visible on any selected toolbar. In response, the graphic object is activated, and the object dropped serves as an input to an action that occurs as a result of the activation.

The user can select a plurality of properties for the stack.

A label identifying an object represented by each graphic object is displayed when the user moves a cursor over the graphic object. Furthermore, the label identifies a non-selected toolbar when the user moves the cursor over a visible portion of any non-selected toolbar.

Another aspect of the present invention is directed to a graphic operating system that is implemented on a computer. The graphic operating system includes graphic objects that appear on a computer display and comprises a plurality of means for implementing functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
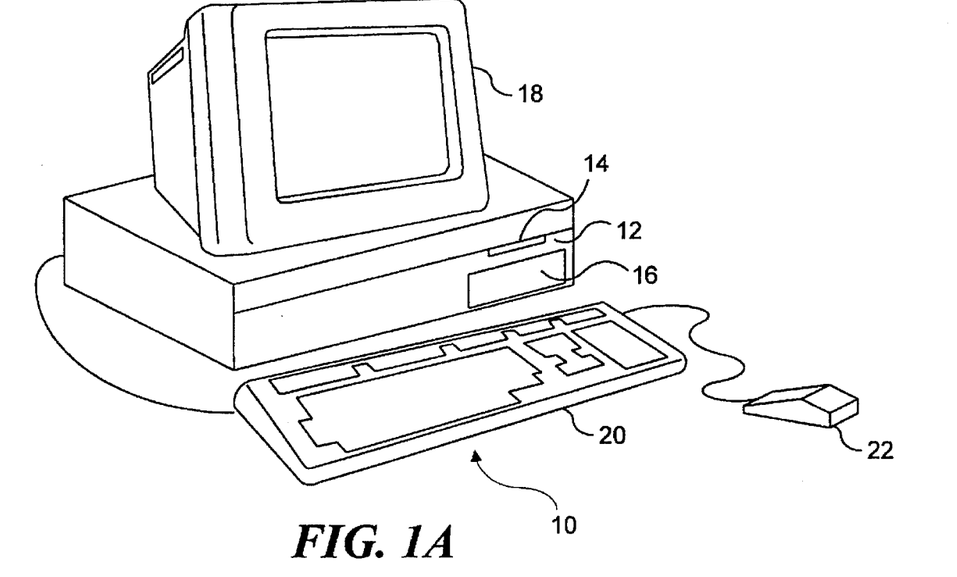
FIG. 1A is a block diagram of a personal computer suitable for use in implementing the present invention.
Figure 1B:
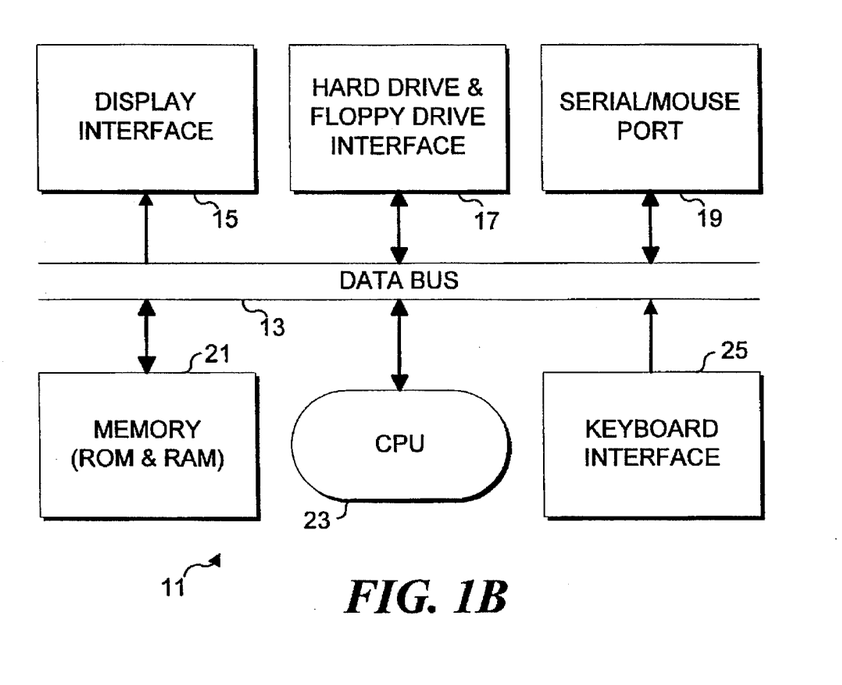
FIG. 1B is a block diagram showing some of principle components of the processor chassis in the personal computer of FIG. 1A.

With reference to FIG. 1A, a generally conventional personal computer 10 is shown, which is suitable for implementing the present invention. Personal computer 10 includes a processor chassis 12 in which are disposed a mother board and a plurality of other circuit boards (neither separately shown) of the type conventionally used in a personal computer. The mother board includes a central processing unit (CPU) 23 and memory 21, including both read only memory (ROM) and random access memory (RAM) that are coupled to the CPU through a data bus 13, as shown in FIG. 1B. Also coupled to the CPU through the data bus are a display interface 15, a hard drive and floppy drive interface 17, a serial/mouse port 19, and a keyboard interface 25. Although many other internal components of processor chassis 12 are not shown, those of ordinary skill in the art will appreciate that such components and their interconnection are well known. Accordingly, further details concerning the internal construction of personal computer 10 need not be disclosed in connection with the present invention.

Personal computer 10 includes a floppy drive 14 and a hard drive 16 that are driven through the corresponding interface noted above, for use in writing and reading files stored on magnetic media. An operating system can thus be readily loaded on hard drive 16 by copying the necessary files from floppy disks that are inserted into floppy drive 14. When the personal computer is "booted up" on the operating system from the files stored on hard drive 16, the program instructions comprising these files are loaded into memory 21 and executed by CPU 23, causing graphic elements of the operating system to be displayed to a user on a display 18. The user interacts with programs executing on personal computer 10 by entering instructions or selections on a keyboard 20, and/or through use of a mouse 22 (or other pointing device suitable for maneuvering a cursor on computer display 18) to select and activate objects that are graphically displayed thereon.

The preferred embodiment of the present invention is designed to operate within a graphic operating system, such as Microsoft Corporation's WINDOWS operating system. However, it should be understood that the invention can readily be implemented in other graphic operating systems. A graphic operating system enables the user to select objects using mouse 22 or other suitable pointing device, thereby minimizing textual input required of the user on keyboard 20. Typically, a graphic operating system provides graphic objects that can be activated when the user moves the cursor over a graphic object and selects it by clicking on the select button on the pointing device (typically, the left mouse button unless changed by the user). For example, if a graphic object represents a word processing program, double clicking on the graphic object causes the word processing program to be executed by the computer. To select a tool represented by a graphic object, the user moves the cursor over the graphic object and clicks once with the select button on the pointing device. As used in this description and in the claims that follow, a graphic object includes virtually any object that can be graphically displayed on a toolbar. In addition to graphic icons such as buttons that represent tools, hardware, programs, and controls, the preceding definition of graphic objects is intended to encompass, without limitation, other objects such as drop-down boxes, list boxes, and spinners.

Figure 2:
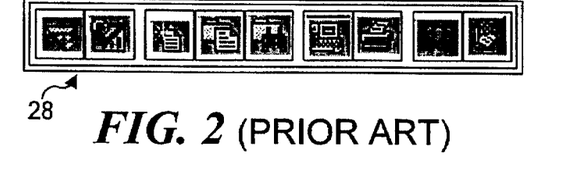
FIG. 2 (prior art) is a conventional horizontal "Office" toolbar on which are disposed a plurality of graphic object buttons that can be selected by the user to activate an object on a computer.

FIG. 2 illustrates a typical toolbar on which a plurality of graphic objects are arranged in a linear array 28. This example of a prior art toolbar, which comprises a plurality of buttons linearly arrayed in a line, side-by-side, has previously been used in such applications as Word for Windows 6 and Excel 5, both distributed by Microsoft Corporation. Other applications have also used either a vertical or horizontal array of graphic objects that present various tools, controls, or programs that can be selected by the user with a pointing device.

As noted above in the Background of the Invention, the area available on a computer display for presenting a plurality of such toolbars or tool panels is limited, since each toolbar or array of graphic objects displayed on the screen takes up space that is needed for the text, data, and/or images of applications in which the user is working. To reduce the amount of space required to display a plurality of toolbars, some prior art designs have displayed a single toolbar and used tabs extending along the side of the toolbar that enable a user to selectively open other toolbars. Each tab is associated with a different toolbar or menu that is displayed when the tab is selected by a user. However, the tabs are not part of the toolbar that is already open. Furthermore, the tabs typically use space in the screen or window that would normally be available to an application. Examples of a tabbed toolbar appear in DELPHI™, a development program marketed by Borland Corporation.

Figure 3:
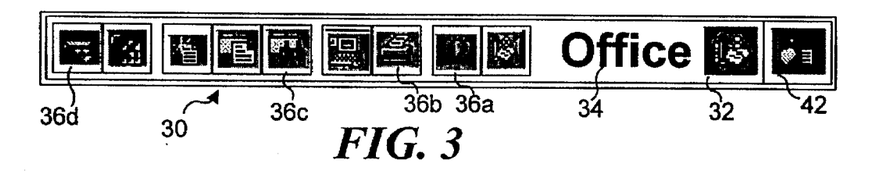
FIG. 3 is a horizontal stacked toolbar in accordance with the present invention, in which the Office toolbar of FIG. 1 is displayed as it appears stacked on top of a "Desktop" toolbar, typically docked at the top or bottom of the display screen.
Figure 4:
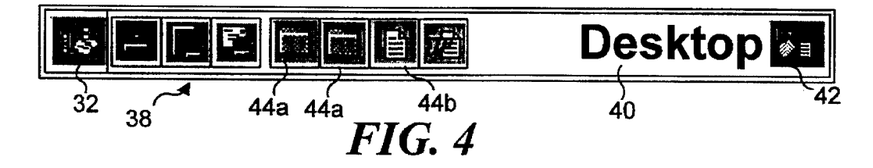
FIG. 4 illustrates the stacked toolbar of FIG. 3 in which the Desktop toolbar has been selected to be on top of the Office toolbar.
Figure 5:
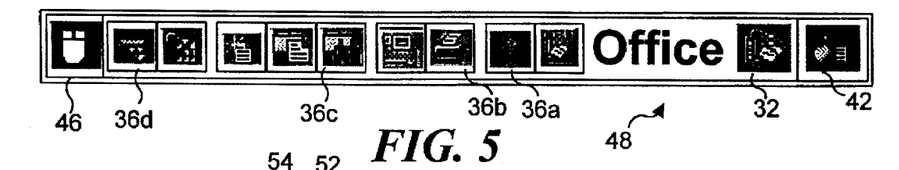
FIG. 5 illustrates another stacked toolbar similar to that of FIG. 3, but with a "Mouse" toolbar included in the stack.

As shown in FIGS. 3 through 5, the present invention substantially reduces the space required to provide access to a plurality of different toolbars, by stacking the toolbars so that typically only the graphic objects associated with one or more of the toolbars in the are visible at a time. Although the embodiments shown in FIGS. 3 through 5 all contain only a single toolbar in which the graphic objects are fully visible, it is also contemplated that a plurality of toolbars in a stacked toolbar might be fully visible, for example, in a side-by-side configuration. A stacked toolbar 30 in FIG. 3 illustrates how a plurality of graphic objects including buttons 36a, 36b, 36c, and 36d are fully visible on the toolbar that is currently selected. This visible group of graphic objects is on a toolbar identified both with a text label 34 reading "Office" and by a distinctive logo 32, which is also a control button. It will be apparent that the graphic objects visible on stacked toolbar 30 look similar to those on the prior art toolbar shown in FIG. 2. However, stacked toolbar 30 differs substantially from the prior art toolbar, because a logo 42 (also a control button) is visible at one end of the stacked toolbar, but is not evident in the prior art toolbar. Logo 42 is associated with the graphic objects grouped on a "non-selected toolbar," i.e., a toolbar that is not fully visible. The graphic objects on the non-selected toolbar are on a portion of that toolbar that is hidden by the selected Office toolbar.

In a stacked toolbar 38 shown in FIG. 4, the graphic objects associated with the toolbar identified by logo 42 and a text label 40 reading "Desktop" are fully visible. Note that in stacked toolbar 38, the graphic objects associated with the Office toolbar are now hidden by the Desktop toolbar, so that only the logo 32 is displayed at one end.

Similarly, in FIG. 5, a stacked toolbar 48 is shown in which the graphic objects comprising the Office toolbar are fully visible on a stack of toolbars that includes two other toolbars with groups of graphic objects. The first of these other toolbars is the Desktop toolbar. The logo associated with the Desktop toolbar appears at one end of the stack. A different group of graphic objects is disposed on a toolbar associated with a mouse logo 46 (also a control button), which is visible at the opposite end of the stack from the logo 42. Although not specifically shown, the graphic objects associated with the Mouse toolbar are used for setting parameters that control the interactive operation of mouse 22.

It should be noted that a logo and/or text may be assigned to a class of toolbars, rather than to a single toolbar.

Generally, a logo will be used with a toolbar or class of toolbars that logically represents the type of graphic objects included thereon. The border color of a toolbar is helpful in distinguishing one toolbar from another. A "tooltip" feature (discussed below) also helps to identify the various toolbars in a stack, in the event that a user is unfamiliar with or forgets the types of toolbars that are included in a stack.

In the preferred embodiment, the Z order (i.e., stacking order) remains constant as the selected (fully visible) toolbar is changed in response to a user's choice, to enable the graphic objects on a different toolbar to become visible. The toolbars that must move to reveal the graphic objects on a newly selected toolbar depends on the relative position of the newly selected toolbar in the stacking order. A simple example will illustrate the simplicity with which the stacked toolbars move to enable access of any graphic object on any toolbar in the stack. To access graphic objects 44a and 44b (FIG. 4), when stacked toolbar 48 is on the display screen (FIG. 5), the user simply moves the cursor with the pointing device so that the cursor rests over the visible portion of the partially hidden toolbar, e.g., over logo 42, and then clicks the selector button on the pointing device. The previously selected Office toolbar will then slide left, exposing the group of graphic objects comprising the Desktop toolbar. Thereafter, if the user again wishes to access graphic objects 36a through 36d on the Office toolbar (FIG. 3 or FIG. 5), the user selects logo 32 with the pointing device, causing any toolbar(s) hiding the graphic objects on the Office toolbar to slide away, so that graphic objects 36a through 36d (and all other graphic objects on the Office toolbar) are again displayed.

Figure 13:
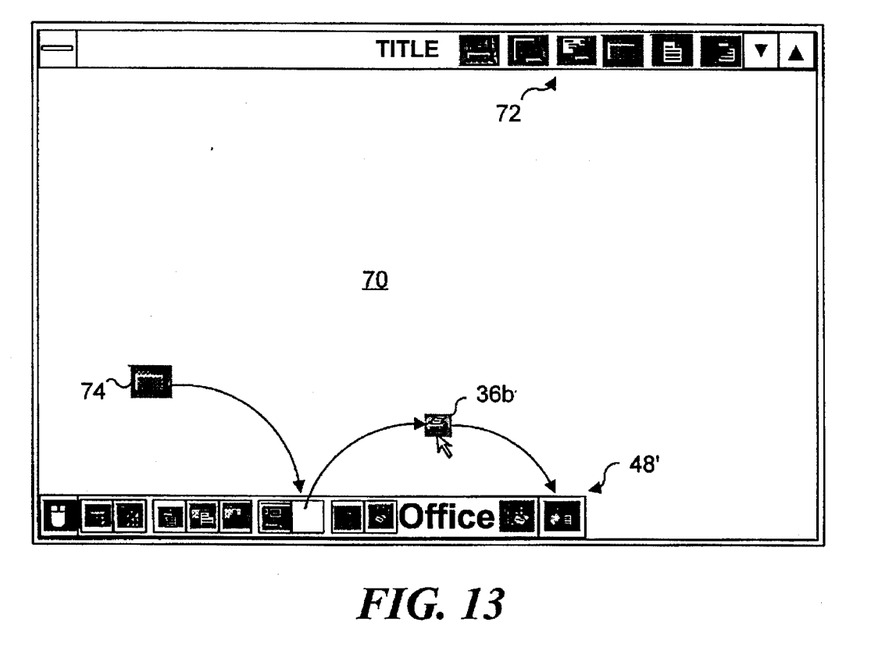
FIG. 13 is a graphic window showing a docked stacked toolbar and a stacked toolbar that has been autofit in the title region of the window.

Stacked toolbars on which the graphic objects are arranged in a horizontally extending array, as shown in FIGS. 3 through 5, are typically docked or anchored at the edge of the display screen or window so that the central portion of the display screen or window is available for any application that is then running on the computer. FIG. 13 shows a toolbar 48' docked at the bottom of a window 70. To dock a stacked toolbar, the user simply moves the stack until it is proximate the edge of the display screen or window. For example, as the stacked toolbar approaches the top or bottom edge, the stacked toolbar will automatically change to the single horizontal row array of graphic objects as shown in FIGS. 3 through 5 and anchor itself to the edge of the display screen or window as shown in FIG. 13.

Figure 8:
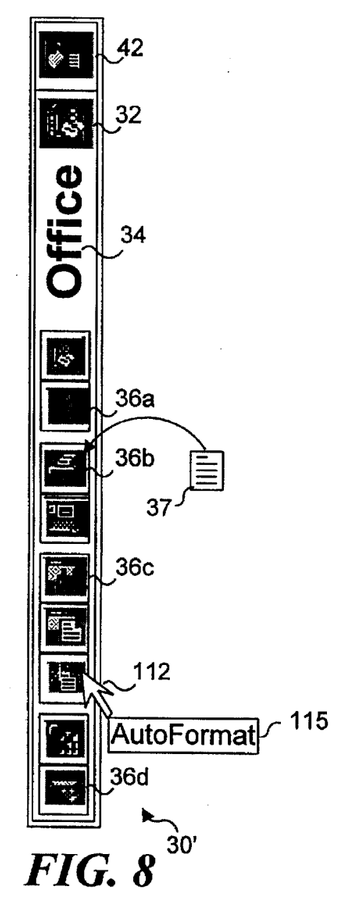
FIG. 8 illustrates a vertical stacked toolbar similar to the horizontal stacked toolbar of FIG. 3, as it appears when docked at the side of the display screen, and showing a "Tooltip" that identifies the function of a button on the toolbar.

A stacked toolbar can also be docked on the left or right edges of the display screen or window to convert it to a vertical toolbar, such as a toolbar 30', which is shown in FIG. 8. Toolbar 30' includes the same graphic objects as toolbar 30 in FIG. 3. Further, vertical stacked toolbar 30' also includes a portion at its upper end on which is disposed logo 42. When logo 42 is selected with the cursor and mouse 22 or other pointing device, the graphic objects of the Desktop toolbar, which corresponding to those in stacked toolbar 38 (in FIG. 4), are displayed vertically. When not anchored at the edge of the display screen in a horizontal or vertical array of graphic objects, the stacked toolbars are described as floating, because they can be readily moved about.

Figure 6:
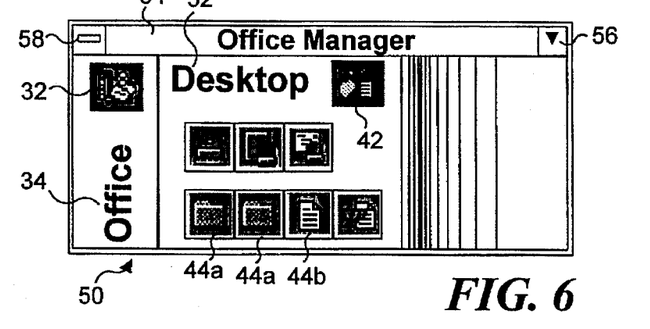
FIG. 6 shows a "floating" stacked toolbar having the rectangular panel shape that is automatically assumed by the stacked toolbar of FIG. 4, when undocked from the edge of the display screen.
Figure 7:
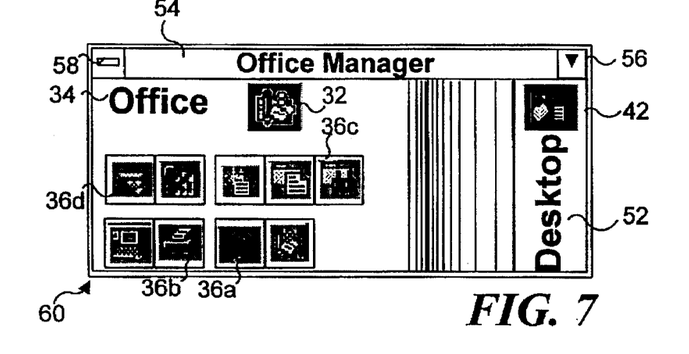
FIG. 7 is a floating stacked toolbar in a rectangular panel configuration automatically assumed by the stacked toolbar of FIG. 3 when it is undocked from the edge of the screen.

When floating away from the screen or window edge, a stacked toolbars can be readily resized by the user. It is contemplated that a docked toolbar might also be resizeable; however, the preferred embodiment does not permit resizing of a docked toolbar. Although a floating stacked toolbar can also extend in a single row/column array of graphic objects if so sized by the user, a floating stacked toolbar is typically sized into a rectangular panel array of graphic objects (multiple columns and multiple rows of graphic objects), as shown in FIGS. 6 and 7, and the rectangular panel can be oriented with its long dimension extending from left to right or from top to bottom. The rectangular panel includes a title bar 54, a minimize button 56 that minimizes the stacked toolbar to form a single graphic object on the display screen, and an option button 58 that is selected to display a menu of options or doubled clicked to close the stacked toolbar. To reshape a stacked toolbar when it is floating, the user simply moves the cursor until it is adjacent an edge of the toolbar. At this point, the cursor changes from a pointer into two parallel, spaced-apart lines representing a sizing tool, as is customary in the WINDOWS™ graphic operating system. By holding the select button on the pointing device and dragging, the side or end of the stacked toolbar selected by the sizing tool (cursor) is caused to move away from the respective opposite side or end, changing the shape of the stacked toolbar. Resizing is limited or controlled by a resizing algorithm to ensure that the area of the floating toolbar is sufficient to display all of the graphic objects on any toolbar in the stack. Thus, if the user decrease the length of the floating stacked toolbar, its width will increase automatically by an amount that accommodates the minimum area required by any toolbar in the stack.

Figure 17:
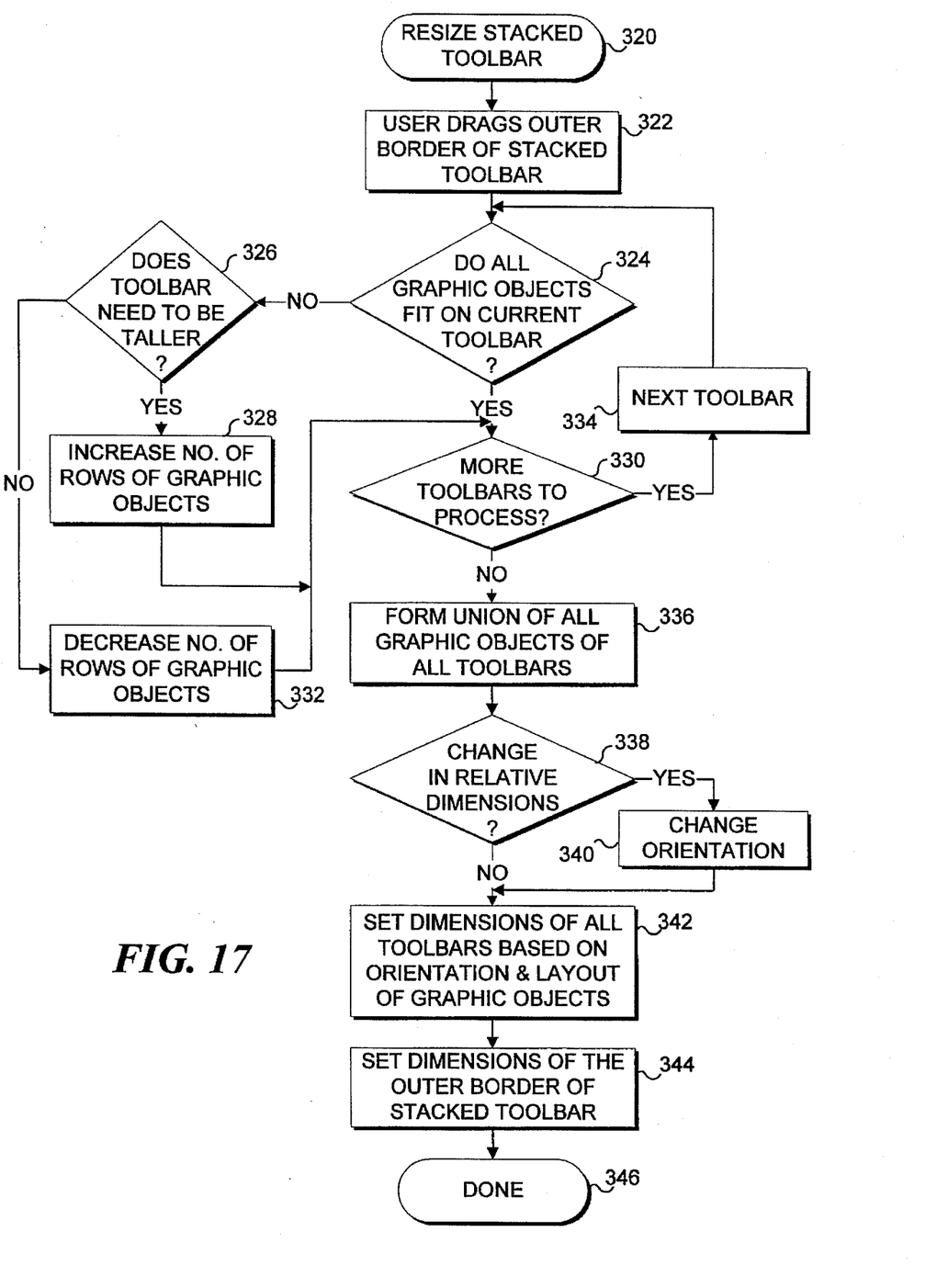
FIG. 17 is a flow chart showing the steps implemented in resizing a stacked toolbar.

A flowchart in FIG. 17 illustrates the steps involved in resizing a floating stacked toolbar, beginning with a block 320. In a block 322, the user drags an outer border of the stacked toolbar with the resizing tool by manipulating the mouse while the select button is depressed with cursor positioned on the border of the stacked toolbar. The system processes each of the toolbars in the stack when the resizing movement is complete, to determine how the stacked toolbar will be displayed. A decision block 324 determines if all of the graphic objects fit on a toolbar currently being processed. If not, a decision block 326 determines if the current toolbar needs to be taller (i.e., from top to bottom). If so, the logic in a block 328 increases the number of rows of graphic objects in the current toolbar so that all of the graphic objects will fit on the toolbar. The procedure then advances to a decision block 330. However, if the toolbar does not need to be taller in decision block 326, the logic proceeds to a block 332, which decreases the number of rows of graphic objects, thereby making the current toolbar wider to accommodate all of the graphic objects on it. The logic thereafter proceeds to decision block 330. Assuming that all graphic objects fit on the current toolbar being evaluated in decision block 324, the logic simply drops to decision block 330 without changing the number of rows of graphic objects on the current toolbar.

In decision block 330, the system determines if there are more toolbars to be processed, and if so, proceeds to a block 334. At this point, the next toolbar in the stack is fetched for evaluation, returning to decision block 324. Once all of the toolbars in the stack have been evaluated in this manner, the logic proceeds with a block 336 following decision block 330.

Block 336 forms a union of all of the graphic objects on all of the toolbars in the stack. This step makes it possible to determine if changes that may have been made in the relative dimensions of the toolbars in blocks 328 and/or 332 will require a change in the layout of the stacked toolbar. Based on the requirements of the union formed of all of the graphic objects, a decision block 338 determines if the relative dimensions of the stacked toolbar must be changed. In other words, has the change made by the user resizing the stacked toolbar border caused the stacked toolbar to be wider than it is taller (compared to its relative orientation before resizing) or vice versa. If a change of this sort has occurred, a block 340 changes the orientation of the stacked toolbar accordingly. If no change is required, or after a change in orientation has been made, the logic continues with a block 342.

Block 342 sets the dimensions of all toolbars in the stack based upon the orientation and layout of the graphic objects on the toolbars following the resizing operation by the user. The stacked toolbar must accommodate the size requirements of the graphic objects on all of the toolbars, and thus will typically have an orientation and layout determined by the toolbar in the stack having the most graphic objects. A block 344 provides for setting the dimensions of the outer border of the stacked toolbar accordingly. The resizing procedure concludes in a block 346.

In FIG. 6, a stacked toolbar 50 is arranged as a panel on which are disposed graphic objects 44a and 44b (among others). A text label 52 and logo 42 appear at the top of the selected Desktop toolbar. Similarly, text label 34, which identifies the hidden toolbar panel on which the graphic objects comprising the Office group are disposed, is displayed at the left side, in a vertical orientation, with corresponding logo 32. By moving the cursor so that it appears within the portion of floating stacked toolbar 50 occupied by text label 34 and logo 32 and then depressing the select button on the pointing device, the user can cause the graphic objects comprising the Office group to be fully disclosed as shown on a stacked toolbar 60 in FIG. 7. The graphic objects comprising the Desktop group are then hidden by the Office toolbar and are not visible. To again selectively display the graphic objects in the Desktop toolbar, the user moves the cursor to the right end of stacked toolbar 60, so that it is on the portion in which text 52 and logo 42 are disposed, and then activates the select button on the pointing device. The graphic objects in the Desktop group are then fully revealed, as shown on stacked toolbar 50 in FIG. 6.

A floating stacked toolbar is moved by selecting its title bar 54 with the cursor and then moving the cursor with the select button on the pointing device held depressed. The stacked toolbar moves with the cursor and can be repositioned on the screen or window in the floating configuration or docked where desired along one of the edges. FIG. 13 illustrates another option in which a stacked toolbar 72 has been moved into the title bar of a window. An auto-fit algorithm sizes the stacked toolbar to fit within the title bar, adjusting the height of the graphic objects to equal the height of the title bar and strips away the border around the stacked toolbar. The auto-sized toolbar is docked in the title bar just to the left of the WINDOWS™ control buttons.

Referring to FIG. 8, a graphic object 37 that represents an object such as a file is shown to illustrate how it can be dragged about on the display screen using the mouse to select and move it and then dropped upon one of the displayed graphic objects within stacked toolbar 30'. In the example shown in this Figure, object 37 represents a document that the user wants to print. This document will be printed when it is dragged and dropped onto graphic object 36b, which corresponds to a printer (not shown) that is connected to the personal computer (or to a local area network to which the personal computer is coupled). When the select button is released to complete the drag-and-drop operation, the printer is activated, causing it to print the document represented by graphic object 37. Similarly, other files represented by graphic objects can be dragged and dropped onto a graphic object representing an application, thereby activating the application so that it runs using the file as an input, e.g., opening the document for editing in a word processing program. Files can also be dropped into folders.

A different type of drag-and-drop operation is used for adding graphic objects to a stacked toolbar. A graphic object that is dragged and dropped onto a toolbar in the stack while the ALT key is depressed is added to the group of graphic objects associated with that toolbar, at approximately the position where the graphic object is dropped. In addition, the graphic objects that are on the toolbar can be shifted left or right to create a space between existing graphic objects. If necessary, the stacked toolbar is resized to accommodate additional graphic objects, since the stacked toolbar has a size determined by the toolbar or group of graphic objects in the stack that requires the most space. A graphic object can also be moved from a toolbar and positioned in the window or display screen as a free floating graphic object. For example, in FIG. 13, graphic object 36b, which represents a printer, is shown as it is moved from the Office toolbar. It can be dropped in the position shown in the Figure, or moved onto the Desktop toolbar. A graphic object 74, representing a folder can then be dragged and dropped onto the Office toolbar to replace the printer.

Figure 9:
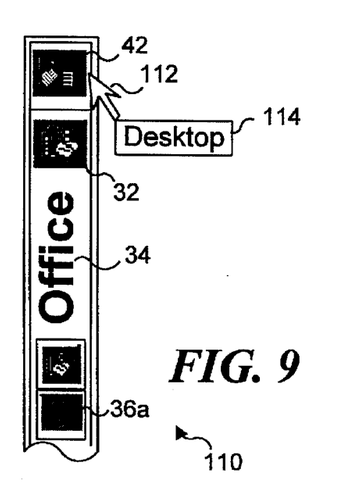
FIG. 9 shows an upper portion of a vertical stacked toolbar, with a "Tooltip" displayed to identify an underlying toolbar.

Since a user may fail to recall the specific entity that is represented by a graphic object or by a logo of the toolbar in the stack, provision is made for displaying a text box label that identifies the graphic object or logo name, when the cursor is moved over the graphic object or logo. For example, in FIG. 9, a portion of a vertical stacked toolbar 110 is shown (similar to vertical stacked toolbar 30'). A cursor 112 is positioned so that it partly overlies logo 42, which is associated with the graphic objects comprising the Desktop toolbar. Accordingly, a text box 114 appears with the word "Desktop" displayed within it, identifying the toolbar represented by logo 42 for the user. A similar text box 115 is displayed in FIG. 8 as cursor 112 is moved over a graphic object on the displayed Office toolbar, indicating that the graphic object activates the AutoFormat function.

A further option provided for the stacked toolbars of FIGS. 3 through 5 is an auto-hide mode wherein the stacked toolbar is completely hidden except for a line a few pixels wide that extends vertically along the edge of the display screen. When the user jams the cursor against the edge of the display screen along which the fully hidden stacked toolbar is disposed, the stacked toolbar is again fully displayed, enabling the user to select any of the graphic objects on the selected toolbar or to choose a hidden toolbar so that its graphic objects are displayed. When the user moves the cursor off the fully displayed toolbar, it returns to the hidden position, i.e., appears to move off the screen or window. Optionally, the user can elect to have the fully hidden stacked toolbar "pop" into the fully displayed position, or can elect to have the hidden toolbar slide into the fully disclosed position, in an animated fashion. The auto-hide mode uses the least amount of display screen area, but the graphic objects on the selected toolbar are not available until the stacked toolbar is selectively displayed.

Figure 10:
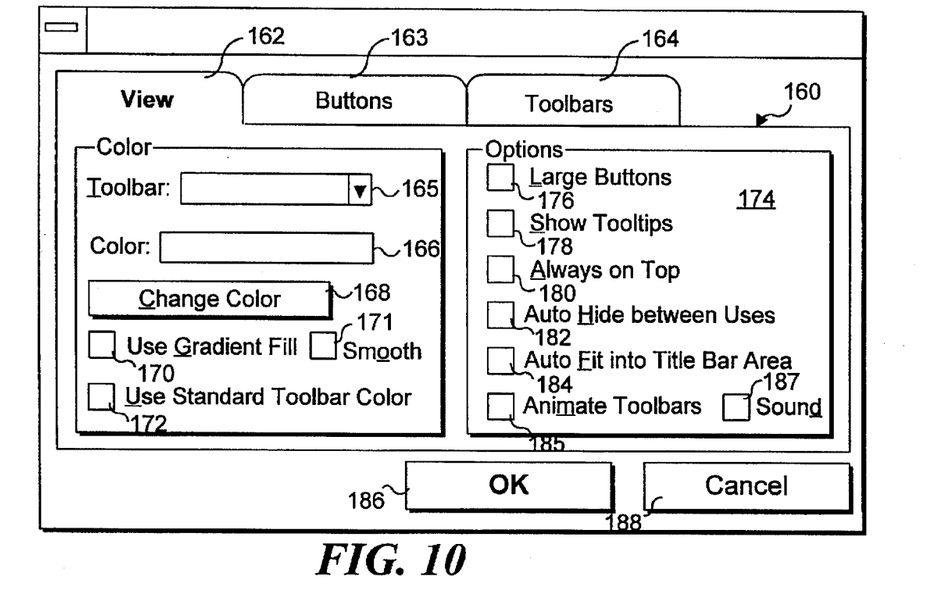
FIG. 10 is a toolbar properties dialog box for the "View" tab.
Figure 11:
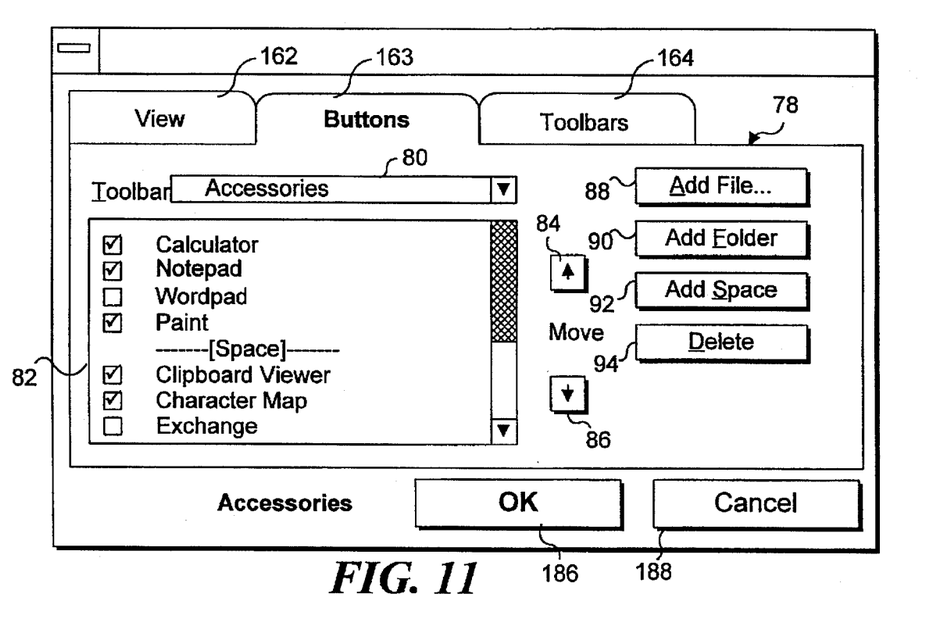
FIG. 11 is a toolbar properties dialog box for the "Buttons" tab.
Figure 12:
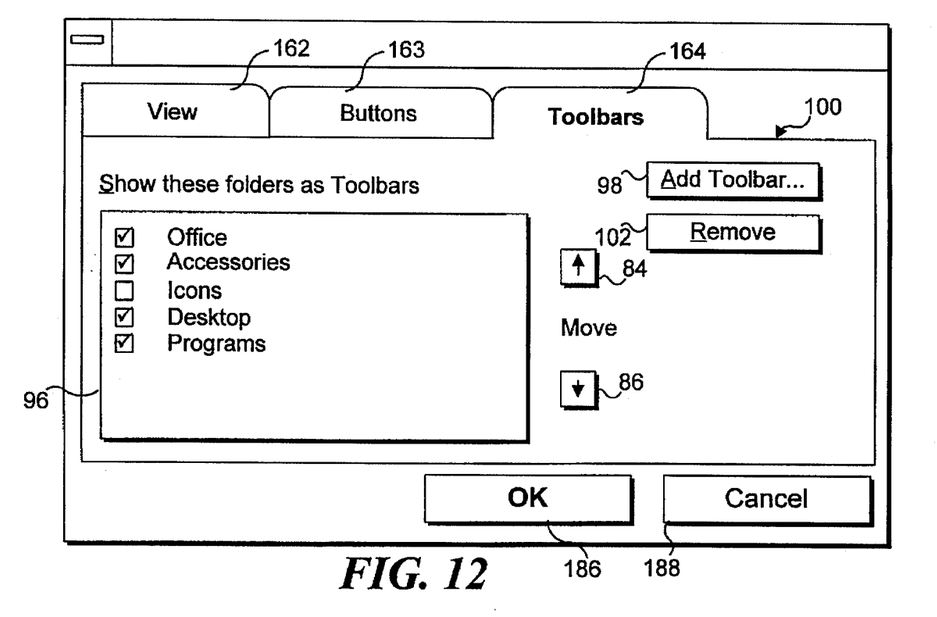
FIG. 12 is a toolbar properties dialog box for the "Toolbars" tab.

Various properties of a stacked toolbar can be selected in a properties dialog box 160 that is shown in FIGS. 10 through 12. In FIG. 10, a tab 162 is presently selected within dialog box 160, enabling the user to control the "View" properties of the stacked toolbar. A tab 163 labeled "Buttons" is selected in FIG. 11 to enable a user to configure the graphic objects used on a selected toolbar, and a tab 164 labeled "Toolbars" can be selected to enable a user to choose the specific toolbars that are included in a stack.

In the View properties, the user can select toolbar from a drop down box 165 and then set a Toolbar background color for the selected toolbar. The currently selected background color appears in a box 166. To change the color, the user selects a Change Color button 168, causing a screen with a color palette (not shown in the Figure) to be displayed, from which the user can select the desired background color. A check box 170 also enables the user to indicate whether a gradient fill should be added to the text on the stacked toolbars. The term "gradient fill" refers to a color scheme in which the background color gradually varies from a dark to a lighter intensity in the area where the text label for the toolbar is disposed (for example, on the right side of floating stacked toolbars 50 and 60 in FIGS. 6 and 7). A smooth characteristic for the background color is selected by placing a check in a check box 171. A check box 172 enables the user to selectively indicate that a Standard Toolbar Color should be used. The Standard Toolbar Color is determined by defaults for the desktop set in the graphic operating system.

In an Options section 174, a check box 176 allows the user to selectively indicate if large buttons are to be included on the stacked toolbars. Large buttons occupy more space but are easier to identify at higher screen resolutions, at which the graphics icons can be relatively small. A check box 178 provides for selectively indicating whether the Tooltips box (i.e., the label box identifying the graphic object or toolbar) is displayed when the user moves the cursor with the pointing device so that it is over one of the graphic objects or logos on the stacked toolbars.

In a check box 180, the user can indicate if the stacked toolbars are always visible on top of the current window, whether docked or floating. Alternatively, the user can check a box 182 to enable the auto-hide mode for the stacked toolbars discussed above, so that only a line a few pixels wide appears along the edge of the screen when stacked toolbars are fully hidden. In a check box 184, the user can elect to enable the auto fit option that enables toolbars to be docked in the title bar of the display screen or window. A check box 185 selectively enables animation of the toolbars so that one or more toolbars slide to disclose the graphic objects on a newly selected toolbar. Similarly, a check box 187 can be selected to enable sound to accompany the animation.

Two additional buttons are included within the dialog box, inside its bottom edge. An "OK" button 186 is the default that is highlighted, enabling the user to indicate that all of the toolbar properties have been set as desired. A Cancel button 188 closes the properties dialog box without changing any of the current properties that were previously selected by the user.

In FIG. 11, a set of control 78 include a drop-down box 80 to enable the user to select a toolbar on which the buttons or other graphic objects are to be modified. In the example shown, an Accessories toolbar has been selected. The graphic objects within the Accessories toolbar are shown in a list box 82. Any of the listed graphic objects can selectively be activated or deactivated to appear in the toolbar, as indicated by a check mark or absence of a check mark in a box adjacent the graphic object. "Move" control buttons 84 or 86 can be selected to shift any graphic object selected in list box 82 up or down within the list, thereby changing the relative position of the graphic object on the toolbar. Controls 88, 90, 92, and 94 respectively enable a user to add a file, folder, or space, or delete a graphic object from the list displayed in list box 82.

Similarly, in FIG. 12, controls 100 are provided to enable a user to specify the toolbars that are to be included in the stack. A list of the toolbars are provided in a box 96. Any of these listed toolbars can be activated for inclusion in the stack by selectively indicating the toolbar with a check mark in an adjacent check box. "Move" control buttons 84 and 86 are provided to change the relatively Z (stacking) order of the toolbars in the stack, by moving a selected toolbar up or down in the list. Controls 98 and 102 respectively enable a user to add a toolbar to the list or remove a selected toolbar from the list.

Figure 14:
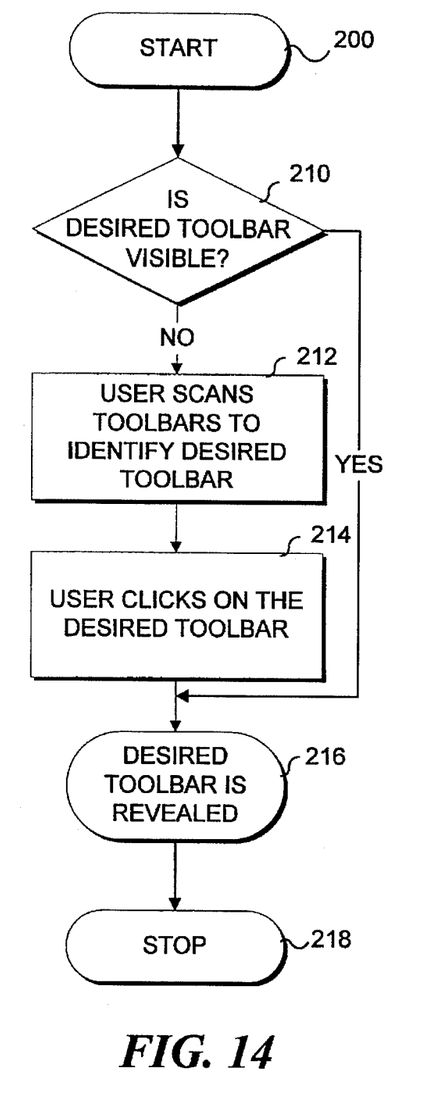
FIG. 14 is a flow chart illustrating the steps of a user in selecting a hidden toolbar in a stack to be fully displayed.

The steps implemented by a user to change the state of a stacked toolbar are shown in FIG. 14, beginning at a start block 200. In a decision block 210, the user determines if a desired set of graphic objects in a toolbar are visible. If the toolbar desired by the user is visible, the user can select one of the graphic objects in the group of graphic objects associated with that toolbar. Accordingly, a block 216 indicates that the desired toolbar is revealed. Thereafter, the logic concludes in a stop block 218. However, if the desired toolbar is hidden by a different selected toolbar, a block 212 indicates that the user scans the displayed text/logos of the other toolbars in the stack, to identify the desired toolbar. Thereafter, as noted in a block 214, the user selects and clicks on the desired toolbar in the stack using the cursor and pointing device. That action causes the graphic objects on the newly selected toolbar that were previously hidden to be revealed, as noted in block 216. The user can then select any of the graphic objects on the newly selected toolbar with the pointing device.

Figure 15:
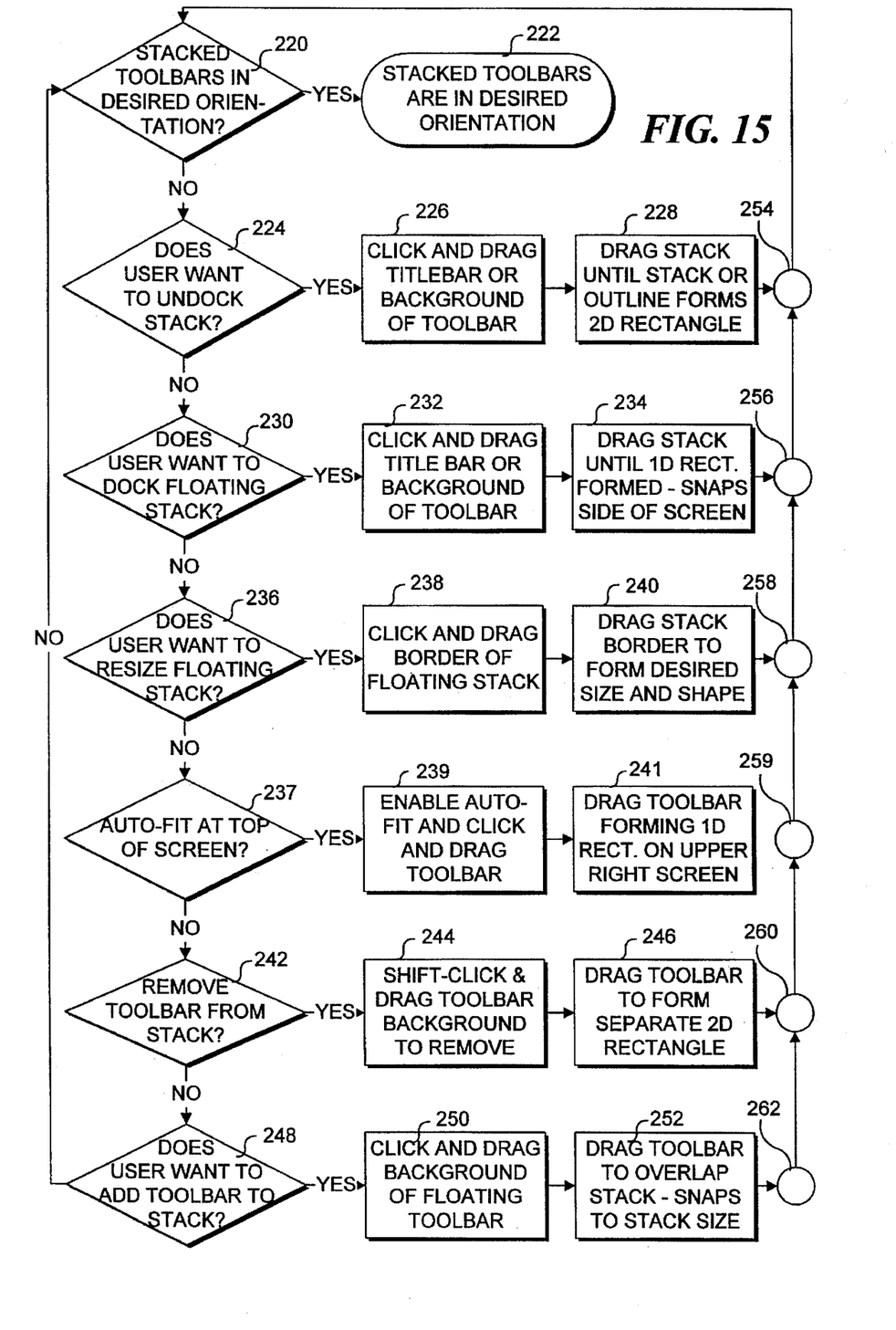
FIG. 15 is a flow chart illustrating the logic implemented in handling the toolbars comprising a stacked toolbar.

In FIG. 15, the logic implemented by the user in changing the state of a stacked toolbar is shown as a series of steps. A decision block 220 determines if the stacked toolbar is in a desired orientation, and if so, proceeds to the result shown in a block 222. At this point, no change in the orientation (or configuration) of the stacked toolbar is required. However, if the stacked toolbar is not in the desired orientation, a decision block 224 determines if the user wants to undock the stacked toolbar from the edge of the display screen or window, where it has previously been anchored. If so, the user selects the stacked toolbar with the cursor and pointing device and drags the stacked toolbar away from the edge of the screen or window. This step is indicated in a block 226. A block 228 indicates that the stacked toolbar automatically forms a rectangular panel (a stacked toolbar like those shown in FIGS. 6 and 7) as it is moved away from the edge of the display screen.

If the user is not undocking a stacked toolbar from the edge of the display screen, a decision block 230 determines if the user intends to dock a stacked toolbar that is floating. For an affirmative response, the logic flows to a block 232, which indicates that the user has clicked the selector of the mouse or other pointing device while the cursor is on the title bar or background of the stacked toolbar. In a block 234, the user drags the stacked toolbar, causing the stacked toolbar to automatically form a one-dimensional rectangle (single row or column of graphic objects) that snaps into a docked position at the adjacent edge of the display screen or window.

If the response to decision block 230 is negative, a decision block 236 determines if the user wants to resize a floating stacked toolbar. If so, a block 238 indicates that the user is clicking and dragging the border of the floating stack which has been selected after the cursor has changed to a resizing mode. In a block 240, the user drags the border of the stacked toolbar to achieve the desired two-dimensional size and shape, subject to the autosizing limitations that ensure the area is sufficient to display the graphic objects included within any of the toolbars comprising the stacked toolbar.

A negative response to decision block 236 leads to a decision block 237, which determines if the users wants to auto-fit the stacked toolbar within the title bar at the top of the display screen or window. If so, a block 239 provides for enabling the auto-fit feature so that the use can click on the stacked toolbar title bar or background and then drag the stacked toolbar onto the title bar of the display screen or window. As the user drags the stacked toolbar onto the title bar, a block 241 indicates that the stacked toolbar becomes one-dimensional, forming a horizontal line of graphic objects in the title bar.

Figure 16:
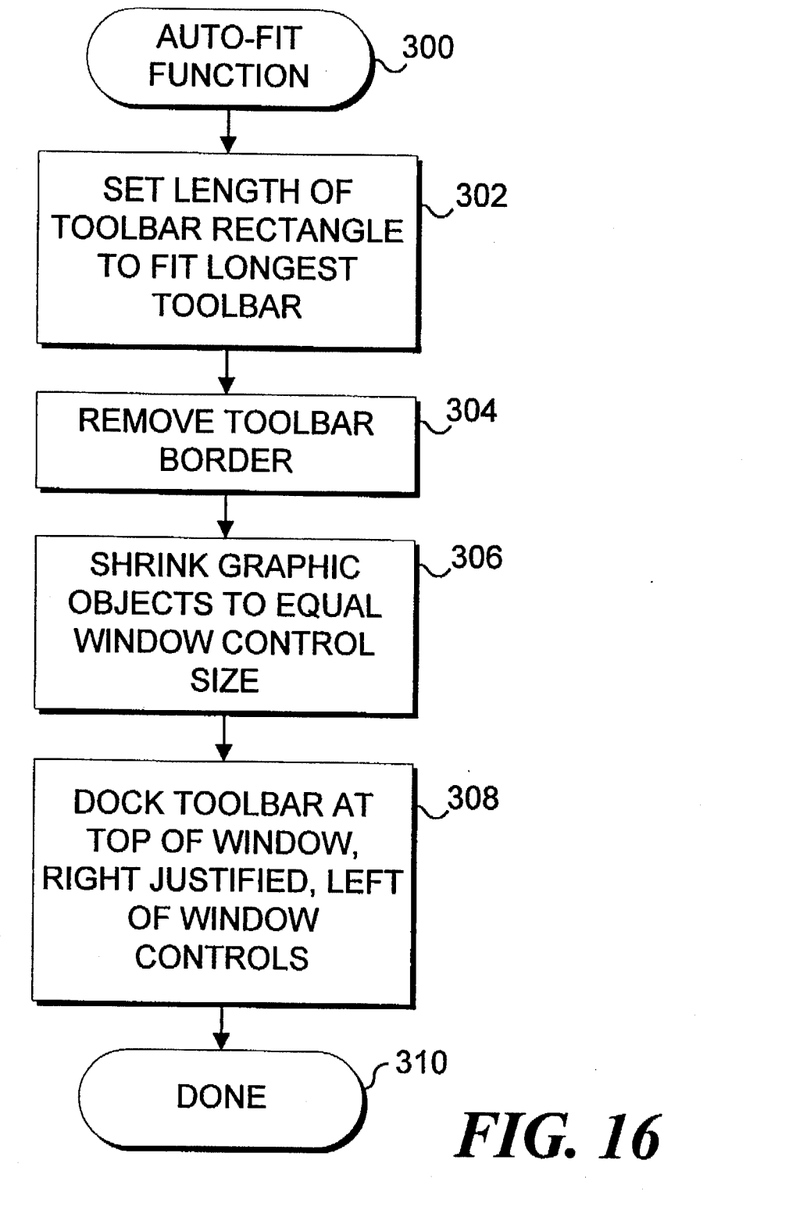
FIG. 16 is a flow chart showing the logic steps in the autofit function used to position a stacked toolbar in the title bar.

Details of the logic implemented in auto-fitting a stacked toolbar within the title bar are shown in FIG. 16, beginning at a block 300. In a block 302, the logic sets the width of the stacked toolbar one-dimensional rectangle to fit the largest (i.e., the longest) toolbar in the stack. In a block 304, the border of the stacked toolbar is stripped away. Next, in a block 306, the graphic objects in the stacked toolbar are sized to equal the WINDOWS™ control button size, enabling them to fit within the title bar. A block 308 provides for docking the stacked toolbar at the top right corner of the window or display screen, right justified left of the WINDOWS™ controls in the title bar. The logic concludes in a block 310.

With reference to FIG. 15, a negative response to decision block 237 leads a decision block 242. In this block, the graphic operating system determines if the user wants to remove a toolbar from the stack. If so, the user presses a designated control key while selecting the background of 20 while selecting the background of the top toolbar and then drags the selected toolbar with the pointing device to remove the selected toolbar from the stack, as indicated in a block 244. As shown in a block 246, the user drags the toolbar away from the stack to form a separate two-dimensional rectangle (multiple rows/columns) that is not stacked with any other toolbar.

A negative response to decision block 242 leads to a decision block 248, which determines if the user wants to add an additional toolbar to the stack. If so, as indicated in a block 250, the user does so by clicking and dragging the background of a floating toolbar that is not part of the stack, so that as indicated in a block 252, the floating toolbar overlaps the stack. At this point, the toolbar that has been dragged into contact with the stacked toolbar snaps to the stack size and the graphic objects on the newly added toolbar are fully displayed. A negative response to decision block 248 returns to decision block 220.

Following each of blocks 228, 234, 240, 241, 246, and 252, respectively, are nodes 254, 256, 258, 259, 260, and 262. These nodes represent the state of the stacked toolbar following the change caused by the actions of the user. Any further changes to the state of the stacked toolbar are made by returning to decision block 220 to repeat the logic just disclosed.

When a user selects a toolbar that is currently hidden to enable the graphic objects included therein to be fully displayed, the most direct technique to accomplish this task would be to simply replace the image of the graphic objects on the previously selected toolbar with the image of the graphic objects on the newly selected toolbar that was just chosen by the user, so that the graphic objects on the newly selected toolbar are fully displayed. The portion of the previously selected toolbar that includes the text and/or logo would then appear at one end of the stack after it is thus redrawn on the display screen. However, in the preferred embodiment of the present invention, a different approach was adopted for replacing the graphic objects previously selected toolbar with the graphic objects of a newly selected and previously hidden toolbar. Specifically, when the user selects a new toolbar by clicking on its logo, text, or on the exposed background area adjacent the logo or text, one or more toolbars appear to slide toward an end of the stack, exposing the graphic objects on the new selected toolbar. The sliding animation employed to expose the graphic objects on the newly selected toolbar is made even more realistic by providing an audible "swooshing" sound that accompanies the slide, and by causing any toolbar that is moving to decelerate as it approaches its final rest position and to appear to "bump" before settling to rest at that position.

There are two ways to implement the animated slide and bump used in the preferred embodiment. The first method is called a "synchronous slide", as indicated in a block 270 within FIG. 18, because once the user initiates the sliding motion, it cannot be interrupted until the animation sequence is complete. The term "synchronous" is appropriate, because the animated sequence is performed as a singular operation that cannot change direction in mid-animation. The graphic operating system handles the apparent sliding motion, starting from an initial position in a block 272. In carrying out the animated sliding motion that is referred to as a "SLIDE" in a block 274, a value for the current position of the moving toolbar(s) is first determined in a block 282. That position, which is represented by the variable POS', is equal to a function $F_A(POS, END)$ in a block 282, where END is the final position after the slide is completed, and POS is the current position of the moving toolbar(s). The animation is done by successively changing the displayed position of the moving toolbar(s) on the display screen each time that a predefined delay time has elapsed, as indicated in a block 286, so that the position of the moving toolbar(s) is adjusted, as indicated in a block 284. With rapid successive redraws of the display screen at a rate at least equal 15 times/second, the toolbar(s) appear to slide smoothly across the display screen.

Figure 18:
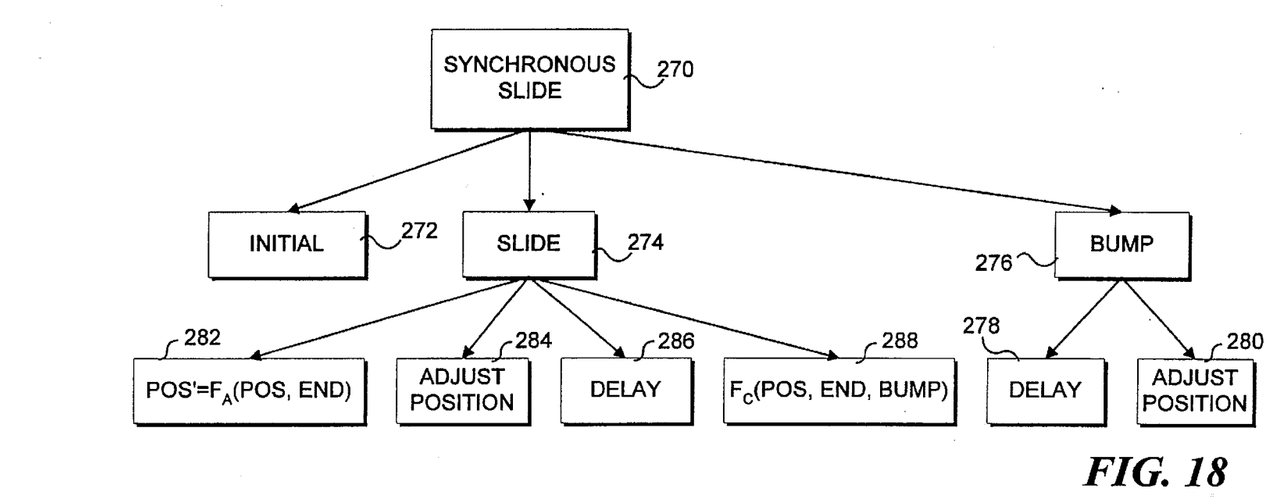
FIG. 18 is a Jackson structured programming diagram showing the steps involved in synchronously moving one of the toolbars from an initial position to its end position.

$F_A$ is an acceleration/deceleration function that modifies the apparent degree to which the position of the toolbar(s) changes after each successive predefined time delay. In a block 288, a termination function $F_C(POS, END, BUMP)$ controls the position of the sliding toolbar as it approaches the END position to implement the BUMP effect. A block 276 implements the apparent BUMP at the end of the slide by adjusting the position of the moving toolbar, as noted in a block 280, after successive time delays, as indicated in a block 278.

In the preferred embodiment, $F_A$ determines the next position of the moving toolbar(s) by taking the previous position and adding the minimum of the constant "2" (pixels) and the function (END-POS/4). In accordance with the function $F_C$, the moving toolbar is shifted to a position, POS<END (or BUMP). In the preferred embodiment, the value of BUMP is a constant "4" (pixels) on the display screen.

Figure 19:
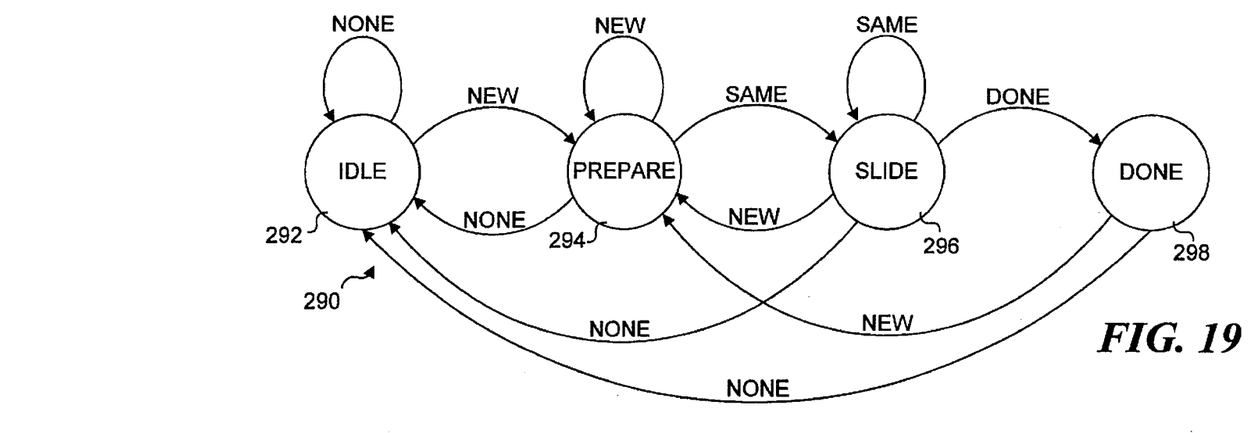
FIG. 19 is state machine diagram illustrating an asynchronous method for sliding a toolbar from an initial position to an end position.

A better way to handle the animation uses an asynchronous method, which is illustrated in the state machine diagram of FIG. 19. If the asynchronous method is employed, the user is able to change the choice of a selected toolbar, before the graphic objects comprising the newly selected toolbar are fully exposed, and can instead select another toolbar. The asynchronous animation involves exposing the graphic objects on a newly selected toolbar and hiding the graphic objects on another toolbar that was previously selected. In the state machine shown in FIG. 19, a change of state occurs with respect to the toolbar that includes the graphic objects to be displayed based upon events caused by user input. The user input thus controls how the graphic objects on a toolbar are exposed. The states and events illustrated in state machine 290 are defined by the following Table 1.

TABLE 1

| STATE | DEFINITION |
| --- | --- |
| Idle | Waiting for input or an event to occur |
| Prepare | Toolbar is readied to be moved |
| Slide | Toolbar is moved |
| Done | Movement of toolbar is completed |
| EVENT | DEFINITION |
| None | No event |
| New | New toolbar is selected |
| Same | Same toolbar is selected |
| Done | Toolbar reaches end position |

The state machine starts in an initial IDLE state 292. A time interval elapses between each change of state, and the changes are dependent upon the current input event. While in IDLE state 292, state machine 290 takes no action if no user input occurs. If the user selects a new panel, the state changes to a PREPARE state in a block 294. At this point, the user can select the originally selected toolbar (which corresponds to a NONE action), thereby returning to IDLE state 292, or can select a NEW toolbar to be displayed, which leaves the state machine in the PREPARE state. If the user does not change the original selection, the state changes to SLIDE in a block 296. At this point, the appropriate toolbar(s) starts sliding by incrementally changing position in subsequent screen redraws, in order to display the graphic objects on the newly selected toolbar. However, while the toolbar(s) are sliding to disclose the graphic objects, the user can select a NEW toolbar to be displayed, returning to the PREPARE state in block 294, or can select the original toolbar to continue to be displayed (NONE), causing a return to the IDLE state, or can allow the slide to continue until it is DONE, as indicated in a block 298. Once the slide is completed, the user can select yet another NEW toolbar to be displayed, returning to the PREPARE state in block 294 or can select no further action, leaving the state machine in the IDLE state in block 292.

Although the present invention has been described in connection with the preferred form of practicing it, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A method for providing access to a plurality of graphic objects on a computer display, comprising the steps of:
   (a) organizing the plurality of graphic objects into a plurality of generally quadrilaterally shaped toolbars, each toolbar comprising a group of associated graphic objects organized in an array;
   (b) creating a stack with the plurality of toolbars on the computer display, so that any selected toolbar is fully visible and hides a substantial portion of any non-selected toolbar from among the plurality of toolbars; a graphic object in any selected toolbar that is fully visible to a user on the computer display being directly selectable by the user to activate said graphic object; and
   (c) enabling the user to choose any non-selected toolbar from among the plurality of toolbars of graphic objects, to make the non-selected toolbar that is thus chosen by the user become a selected toolbar that is fully visible to the user on the computer display, causing a previously selected toolbar to become a non-selected toolbar that is no longer fully visible, a substantial portion of the previously selected toolbar being substantially hidden by the toolbar just chosen by the user.

2. The method of claim 1, wherein the graphic objects include buttons that are activated when the user clicks a select button on a pointing device while a cursor controlled by the pointing device is positioned over the button.

3. The method of claim 1, wherein each of the toolbars is provided with a characteristic identification that distinguishes that toolbar from at least some of other toolbars disposed in the stack.

4. The method of claim 3, wherein the characteristic identification includes at least one alphanumeric character that is disposed on the toolbar in a position so that said at least one alphanumeric character is visible when a substantial portion of the toolbar is hidden by a selected toolbar.

5. The method of claim 3, wherein the characteristic identification comprises a logo that is disposed on the toolbar in a position so that the logo is visible when a substantial portion of the toolbar is hidden by a selected toolbar.

6. The method of claim 5, wherein the logo includes at least one alphanumeric character.

7. The method of claim 1, wherein a separate toolbar is added to the stack by enabling the user to select the separate toolbar with a pointing device and then to drag the separate toolbar onto the stack.

8. The method of claim 1, further comprising the step of enabling the user to select the stack with a pointing device and to drag the stack to an edge of a window on the computer display screen, docking the stack at said edge.

9. The method of claim 1, further comprising the step of enabling the user to change an orientation of the stack between vertical and horizontal, said orientation relating to a longitudinal dimension of the plurality of toolbars comprising the stack.

10. The method of claim 1, further comprising the step of causing one of the toolbars to slide to a different position in order to enable the toolbar chosen by the user to become fully visible.

11. The method of claim 10, further comprising the steps of causing said one of the toolbars that is sliding to decelerate as it approaches a rest position; and causing said toolbar that is sliding to bounce before stopping.

12. The method of claim 10, further comprising the step of providing an audible sound that is associated with sliding said one of the toolbars.

13. The method of claim 1, further comprising the step of enabling the user to unstack the plurality of toolbars, by selecting one of the toolbars comprising the stack and dragging said one toolbar away from the stack, causing said one toolbar to become a separate toolbar that is no longer a part of the stack.

14. The method of claim 1, further comprising the steps of enabling the user to selectively hide the stack along an edge of a window in the computer display, in an auto-hide mode wherein only a line of pixels comprising a border of the stack is visible at the edge of the window; and, enabling the user to selectively fully display the stack that is hidden in the auto-hide mode.

15. The method of claim 1, further comprising the step of autosizing the stack to encompass the group of graphic objects that is largest within the stack.

16. The method of claim 1, further comprising the steps of enabling a user to selectively move the stack into a border region of a window on the computer display; and, in response, causing the stack to auto-fit within the border by adjusting dimensions of the stack and of the graphic objects fully displayed within any selected toolbar, said stack being positioned adjacent a window control in the border region.

17. The method of claim 1, further comprising the step of enabling the user to selectively float the stack on the computer display, and while the stack is floating, enabling the user to modify a width and a length of the stack.

18. The method of claim 1, further comprising the step of enabling the user to use a pointing device to select a graphic object appearing on the computer display outside of the stack; and, to drag the graphic object that is selected onto a toolbar comprising the stack, thereby adding the graphic object to the group of graphic objects within the toolbar.

19. The method of claim 1, further comprising the step of enabling the user to select one of the graphic objects comprising a toolbar and to drag said one graphic object to another toolbar for association with the group of graphic objects contained therein.

20. The method of claim 19, further comprising the step of enabling the user to select one of the graphic objects comprising a toolbar and to drag said one graphic object to a position outside of the stack on the computer display, causing said one graphic object to become separated from the stack.

21. The method of claim 1, further comprising the step of enabling the user to select an object visible on the computer display with a pointing device; and, to drag and drop the object onto one of the graphic objects comprising the selected toolbar that is fully visible, thereby activating said one of the graphic objects and serving as an input to an action that occurs when said one of the graphic objects is activated.

22. The method of claim 1, further comprising the step of enabling the user to select a plurality of properties for the stack.

23. The method of claim 1, further comprising the step of displaying a label identifying an object represented by each graphic object when the user moves a cursor over the graphic object.

24. The method of claim 1, further comprising the step of displaying a label identifying a non-selected toolbar when the user moves the cursor over a visible portion of any non-selected toolbar.

25. A graphic operating system that is implemented on a computer, said graphic operating system including graphic objects that appear on a computer display, comprising:

(a) means for organizing the plurality of graphic objects into a plurality of generally quadrilaterally shaped toolbars, each toolbar comprising a group of associated graphic objects organized in an array;

(b) means for creating a stack of the toolbars on the computer display so that any selected toolbar substantially hides a substantial portion of any non-selected toolbar in the stack; said group of graphic objects in any selected toolbar being fully visible on the computer display to a user so that a graphic object within said group is directly selectable and activatable by the user; and (c) means for enabling the user to choose a non-selected toolbar to become a selected toolbar, including means for causing the non-selected toolbar thus chosen to become fully visible so that the graphic objects comprising it are visible to the user on the computer display, and so that a substantial portion of a previously selected toolbar is hidden by the toolbar that was just chosen by the user, said graphic operating system thereby reducing an area of the computer display required for displaying the groups of graphic objects comprising the toolbars in the stack.

26. The graphic operating system of claim 25, further comprising a central processing unit that is coupled to the computer display, and memory for storing a plurality of program instructions, wherein the means for organizing, means for creating, and means for enabling are effected on the computer by executing the plurality of program instructions with the central processing unit.

27. The graphic operating system of claim 25, further comprising docking means for enabling the user to select the stack and position it at an edge of a window on the computer display where it remains docked.

28. The graphic operating system of claim 25, further comprising sizing means that enable the user to graphically alter dimensions of the stack.

29. The graphic operating system of claim 25, wherein the sizing means further enable the user to float the stack, and to change its relative horizontal and vertical dimensions while it is floating.

30. The graphic operating system of claim 25, further comprising means for animating one of the toolbars to enable the toolbar chosen by the user to become fully visible, so that said one of the toolbars slides across the stack and decelerates to a stop, with an accompanying audible sound.

31. The graphic operating system of claim 25, further comprising means for adding and removing a selected graphic object respectively to and from the groups of graphic objects comprising the toolbars in the stack, by dragging and dropping the selected graphic object.

32. The graphic operating system of claim 25, further comprising means for adding and removing a specific toolbar respectively to and from the plurality of toolbars in the stack, by dragging and dropping the specific toolbar.

33. The graphic operating system of claim 25, further comprising means for autosizing the stack to accommodate a largest of the plurality of toolbar comprising the stack.

* * * * *